A. F. HODGSON.
BEE ESCAPE BOARD.
APPLICATION FILED JUNE 13, 1914.
1,252,437. Patented Jan. 8, 1918.
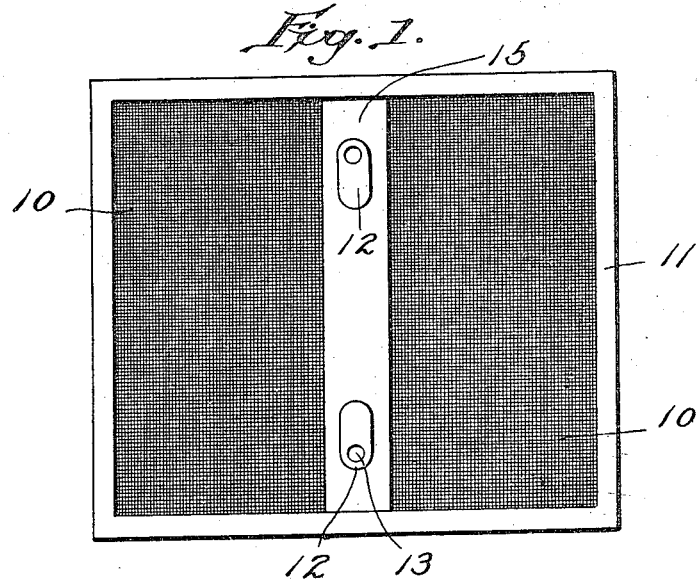
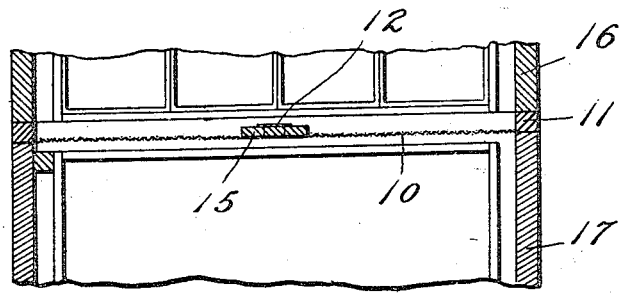
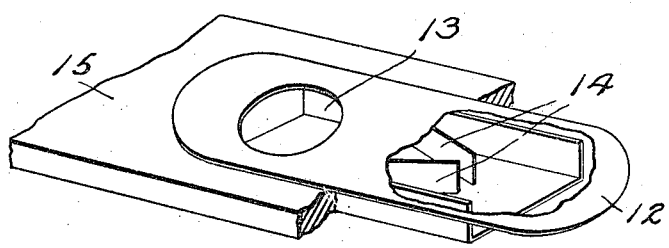
Witnesses
Inventor
Arthur F. Hodgson
By Chas. J. Williamson
Attorney

UNITED STATES PATENT OFFICE.

ARTHUR F. HODGSON, OF JARVIS, ONTARIO, CANADA.

BEE-ESCAPE BOARD.

1,252,437.     Specification of Letters Patent.     Patented Jan. 8, 1918.

Application filed June 13, 1914. Serial No. 845,035.

*To all whom it may concern:*

Be it known that I, ARTHUR F. HODGSON, of Jarvis, Ontario, Canada, have invented a certain new and useful Improvement in Bee-Escape Boards, and do hereby declare that the following is a full, clear, and exact description thereof.

My invention relates to bee escape boards which are used in bee hives to accomplish the removal and temporary exclusion of bees from the super, and my object is to provide a simple and efficient device for this purpose having advantages more particularly pointed out in the specification that follows.

In the accompanying drawings—

Figure 1 is a top plan view of a bee escape board embodying my invention;

Fig. 2 is a vertical section illustrating the same in position for use, the lower portion of the super and the upper portion of the hive below being shown;

Fig. 3 is a detail view in perspective of the quarter bee escape.

In constructing my escape board, I use a woven, or screen wire cloth 10 in the form of one or more sheets, which in order to preserve the shape thereof and protect it, is attached to a light rectangular rim or frame 11 having the horizontal dimensions of the hive. The mesh of the cloth, of course is too small for the passage of the bees, and to enable them to pass from the super above to the hive below, but not permitting their return, I use a suitable bee escape, preferably the well known Porter bee escape, 12, which is in the form of a shallow box or pan, having in its upper side an opening 13 through which bees may pass into the pan and from which through an opening in one end or one side of the bee escape, converge to light springs 14 which normally are so close together at the exit end that the bees cannot pass inward between the same, but which by reason of the lightness of the springs are readily pressed apart as a bee walks, or passes from the inlet opening outward between the converging springs. As shown two of these bee escapes may be provided and for their convenient support I employ a cross bar 15 which extends from one side of the rim, or frame 11 to the other. My bee escape board is used precisely in the same way that the ordinary solid or imperforate escape board is used, that is to say, it is interposed between the bottom of the super 16 and the top of the hive 17.

My open work or reticulated escape, has many important practical advantages. Thus, there is no obstacle to the free circulation of air between the super above and the hive below, so that the deserted combs in the super are not deprived of a desirable degree of heat, or warmth, by reason of the absence of the bees therefrom, because the heat from the bees in the hive below passes through my escape board, and the matter of imparting warmth to the combs is of especial importance in cool weather; and in hot weather excessive heat, with discomfort to the bees in the hive below is avoided by the passage or circulation of air and heat from the hive below into the super. With the solid escape board which has been used heretofore, the heat from the bees in the hive below is confined therein. Besides this important advantage in the matter of dissemination of heat, the openwork or reticulated partition promotes or expedites the clearing or exit of the bees from the super into the hive, or brood chamber below, because it appears to be a principle of bee life that they shall freely mingle and this mingling is promoted by the intercommunication that is possible between bees on opposite sides of the wire cloth through the meshes, or reticulations thereof throughout the horizontal extent of the hive so that those on one side of the reticulated escape board endeavor to join those on the other side and as it is possible by reason of the bee escape for the bees to pass only from the super downward into the hive, or brood chamber below, the result is the mingling of the bees is possible only by the passage of the bees downward, and this is quickly accomplished because their instinct or desire to be together is acted upon through the wide spread communication that is afforded by the large extent of the reticulations.

My bee escape board is light in weight compared with the ordinary solid wooden board, and it is inexpensive to manufacture.

Having thus described my invention what I claim is—

1. As an improvement in bee hives comprising upper and lower hive sections, a bee escape board adapted to be interposed between said sections and having its portion lying between the sections perforated with openings, too small for bees to pass through the same, but permitting free air circulation and having means to permit the passage of bees from one hive section to the other and prevent their passage in the reverse direction.

2. As an improvement in bee hives comprising upper and lower hive sections, a bee escape board comprising a frame adapted to be interposed between the two hive sections and supporting a sheet of screen material having holes too small for the passage of bees but permitting free air circulation, and an opening provided through said sheet establishing communication between the opposite sides of the board and of a size to permit the passage of bees, and means to permit the passage of bees through said opening only in one direction.

3. As an improvement in bee hives comprising upper and lower hive sections, a bee escape board comprising a frame adapted to be interposed between the two hive sections and supporting a sheet of screen material having holes too small for the passage of bees, but permitting free air circulation, a bee escape establishing communication between the opposite sides of the board and having means to permit the passage of bees only in one direction, and a cross bar extending between opposite sides of said frame and at a point intermediate the other two sides of the frame upon which the bee escape is located.

In testimony that I claim the foregoing I have hereunto set my hand.

ARTHUR F. HODGSON.

Witnesses:
M. CAROLINE BOURNE,
FRANCES NEWELL.

Copies of this patent may be obtained for five cents each, by addressing the "Commissioner of Patents, Washington, D. C."